Oct. 9, 1945.  W. A. HERMANSON  2,386,684
FILTER
Filed July 3, 1942
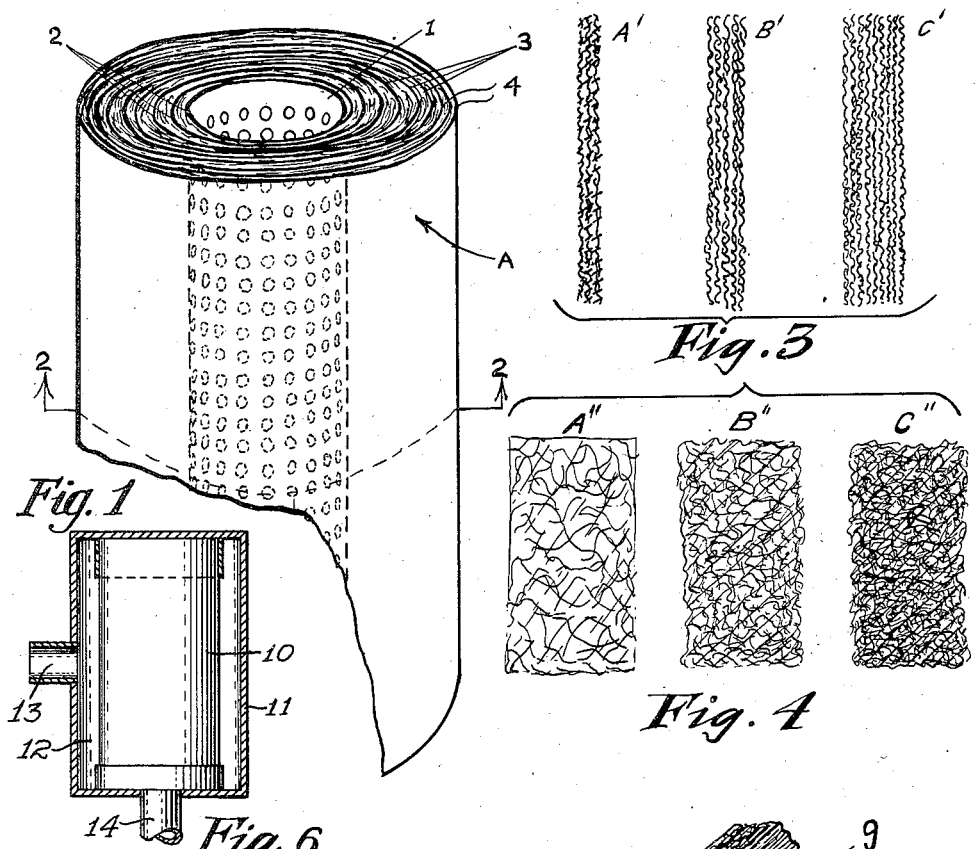
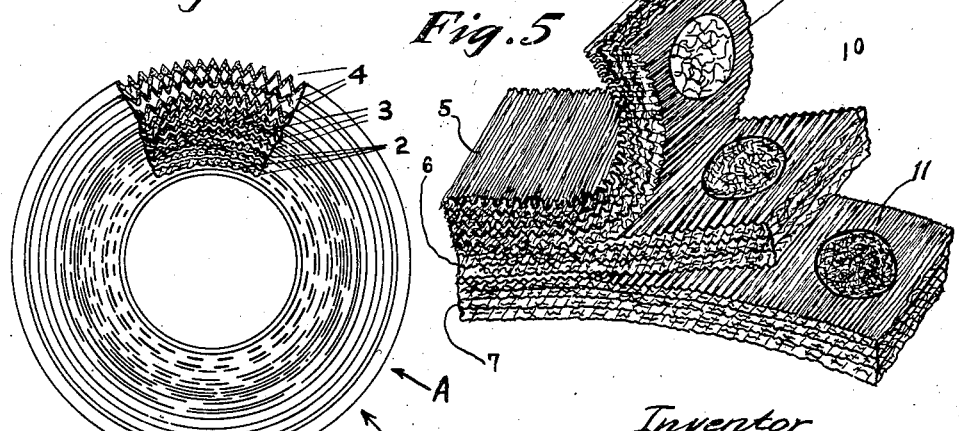
Inventor
William. A. Hermanson
by Ezekiel Wolf
Attorney Patented Oct. 9, 1945

2,386,684

UNITED STATES PATENT OFFICE 2,386,684

FILTER

William A. Hermanson, Brookline, Mass.

Application July 3, 1942, Serial No. 449,603

8 Claims. (Cl. 210—204)

The present invention relates to a physical or mechanical filter for use in the path of flow of liquids and fluids and finds particular use for filtering oils and other aqueous and nonaqueous liquids, which do not react chemically with the materials of the filter. The filter may be used for filtering lubrication oil commonly used in gasoline engines, turbines or any machinery where continuous oil lubrication is employed.

The filter according to the present invention may be of a cylindrical or flat type and in general consists of a plurality of layers of paper material which may have deposited on the fibres a regenerated cellulose coating or be treated with regenerative cellulose solution, the paper itself being formed in deposited layers by deflocculation of the fibers wherein the size of the interstices are governed by the number of layers and therefore the thickness of the sheet so formed.

An object of the present invention is to provide a filter which may be used for a comparatively long time in filtering out particles of collodial and larger sizes and yet, at the same time, offer a constant and substantially non-increasing resistance to the flow of liquid or fluids through the filter.

A further object of the present invention is to make a filter in which the filter portion is readily replaceable and of comparatively cheap material so that as the filter unit is used up, it may be readily and easily replaced by another similar unit at low cost.

A further object of the present invention is to make the filter element out of sheets of deflocculated layers of fibrous material subsequently treated to provide wet strength by the use of a regenerated cellulose treatment on fibers which themselves are non-hydrated.

A further feature of the present invention is that the sheet material may be creped and thereby act to provide additional flow surface as well as additional storage space for the dirt or scum, which may be gathered on the surface of the filter. In the present invention the thickness of the fibrous sheets themselves control the size of the interstices between the fiber elements of the sheet. It should be further noted that preferably the creping of the sheets decrease in the direction of flow, that is, the liquid first comes in contact with the sheets having the greatest creping and then with sheets of successively less creping, while the size of the interstices of the sheets decrease in the same direction, that is, the last sheets in the flow path have the smallest interstices.

The various features of the invention above set forth will be more fully described and explained in description of the invention given below taken in connection with the drawing, showing an embodiment of the same in which:

Figure 1 is a perspective view of a filter in cylindrical form to which the present invention is applied.

Figure 2 shows an end view with a fragment section taken on the line 2, 2, of Figure 1.

Figure 3 illustrates a magnified section successively through outer and inner layers of the filter.

Figure 4 shows in magnification a surface corresponding to the sectional layers of Figure 3, Figure 5 illustrates a flat filter element with portions developed and fragmentary portions shown in magnification and Figure 6 shows the filter of Figure 1 in a casing permitting flow of the liquid to be filtered in the direction as indicated in Figures 1 and 2.

In Figure 1 is shown a cylindrical filter with a perforated center core 1 around which is wrapped or rolled a plurality of groups of layers 2, 2; 3, 3; 4, 4 corresponding to the section shown in Figure 2. The flow of oil or other liquids being filtered is in the direction of the arrows A (Figures 1 and 2).

The first filter group of sheets 4, 4, comprises a light weight paper sheet formed by deflocculation of fibers. This sheet may be a ten pound sheet compared to sheets 3 of fifteen pounds and the sheets 2 of twenty-five pounds before creping, although other ratios of weights may be used, the outer sheets being lighter in all cases than the inner sheets. The outer sheets are creped to a greater degree than the inner sheets, for instance, the first sheet in contact with the flow may have a creping of 100% which will double the sheet's weight per unit length while successively the next two groups may be creped 25% and 10% respectively. Degree of creping is usually measured by the percent change in weight for the same length sheets which is approximately also the same measurement as the decrease in length of sheet. Coarseness and fineness of creping are not usually elements of measurement but rather the depth of the creping or the thickness of the sheet after creping. A sheet creped to a greater calipered thickness has a greater degree of creping and two such sheets, one lying over the other, provide larger isolated spaces. In Figure 2 the thickness of the sheet 4 measured between projecting creping edges is greater than the same corresponding measurements in sheets 3 and 2. It is this measurement which designates the percent creping and is approximately the same measurement as the decrease in length and the increase in weight of the sheet due to creping.

The original lighter weight sheets 4, 4, first in the flow path have the larger interstices and therefore pass the finer particles ordinarily holding back the larger particles. If these lie flatly against the paper surfaces, the interstices may be blocked, but the creping prevents the larger particles from lying flatly against the sheets so that a greater portion of the surface of the creped sheets is always free and exposed to the flow of the liquid. With a greater degree of creping the larger particles are caught and held before they get into the innermost crevices of the paper and the new particles pile up on the ones already held so that the actual surface remains practically free.

The second medium weight sheets have less creping so that the surface of the paper here serves to a greater degree as a filter for particles which are not permitted to pass through. However, the percent creping and the size of the interstices of the sheet as compared with these elements in the first sheet discussed are so chosen so that the interstices become covered up at a no more rapid rate than those of the first sheet. Since the first sheet in most cases picks up the greater residue, the second sheets need less total surface to be effective over the same time range.

The third sheets have the least creping of the three sets but have the smallest interstices. The creping and the size of the interstices are so chosen to pass the allowable particles size which may be no greater than two or three microns and to last approximately for the same working time as the other sets of sheets with approximately undiminished flow.

More than three groups of sheets may be used with the percent of creping and size of interstices varying in generally the same manner as described in connection with the three groups of Figures 1 and 2. The sheets of larger interstices and greater creping are first in the flow path of the liquid being filtered.

In Figure 3 the individual sections are shown enlarged. Here A' shows a thinner sheet section in which there are fewer layers of deflocculated fibers. B' may be composed of 50% more layers and C' may have 150% as many layers as in A'. In each of these cases the layers may form individual sheets and a number of these sheets may go to make up the required thickness for the section.

While the ratio of the different layers may be in the proportion of 1:1.5:2:5, other ratios may be used as for instance 1:1.3:2.0 or 1:2:4 depending to a great extent upon the liquid to be filtered. Where the liquid contains uniform fine particles, the last filter group may have very fine interstices and therefore is heavy compared to the first filter group.

Figure 3 should be considered in connection with Figure 4 which shows the surface of the sheets shown in section in Figure 3; A" corresponding to A'; B" corresponding to B'; and C" corresponding to C'.

In Figure 5 is shown a perspective drawing, layer 5 showing the finest or highest percent creping of the thinner layer sheets with the more open interstices in the magnified ring 9; layer 6 showing the medium creping or medium percent of creping of the heavier layer sheets with the smaller interstices in the magnified ring 10 and layer 7 showing the lowest percent creping of the heaviest layer sheets with the smallest interstices in the magnified ring 11. Figure 6 shows a casing for the filter unit in which the filter unit 10 is surrounded by a casing 11 providing a space 12 which may be filled with the liquid to be filtered supplied through the inlet pipe 13. The center core shown in Figure 1 is hollow and the liquid flow into it is drained by an axially located outlet pipe 14 by means of which the filtered liquid is carried off.

As has been stated above the actual filter form may be varied and while preferably three or more groups of layers may be used, it is possible in some cases where uniform particle sizes are present to use only two groups of layers. In most cases it will be found however that particle sizes vary over a considerable range and that under these conditions, different groups are most useful particularly with different degrees of creping and different size interstices used in the manner above described.

Having now described my invention I claim:

1. Means for filtering fluids and liquids comprising a plurality of groups of sheets formed of deflocculated fibers having wet strength to resist penetration by the fluid and liquid being filtered, said groups of sheets being creped different amounts and arranged in face-to-face relation, those first in the path of flow being creped to a greater degree than those later in the path of flow and means whereby the fluid flow is directed through the sheet in the filtering action.

2. Means for filtering fluids and liquids comprising a plurality of groups of sheets of fibrous paper material having wet strength to resist penetration by the fluid and liquid being filtered, said groups of sheets being creped different amounts and arranged in face-to-face relation; those first in the path of flow being creped to a greater degree than those later in the path of flow and means whereby the fluid flow is directed through the sheet in the filtering action.

3. Means for filtering fluids and liquids comprising a plurality of sheets of fibrous paper material arranged in face-to-face relation having wet strength to resist penetration by the fluid and liquid being filtered, said sheets being creped different amounts, those first in the path of flow being creped to a greater degree than those later in the path of flow and means whereby the fluid flow is directed through the sheet in the filtering action.

4. Means for filtering fluids and liquids comprising a plurality of sheets of fibrous paper material arranged in face-to-face relation having wet strength to resist penetration by the fluid and liquid being filtered, said sheets being creped different amounts, those sheets first in the path of flow being creped to a greater degree than those later in the path of flow, those sheets first in the path of flow having larger interstices than those later in the path of flow and means whereby the fluid flow is directed through the sheet in the filtering action.

5. Means for filtering fluids and liquids comprising a plurality of groups of sheets of fibrous paper material arranged in face-to-face relation having wet strength to resist penetration by the fluid and liquid being filtered, said groups of sheets being creped different amounts, and also having different sizes of interstices, those first in the path of flow being creped to a greater degree and having larger interstices than those later in the path of flow and means whereby the fluid flow is directed through the sheet in the filtering action.

6. Means for filtering fluids and liquids comprising a plurality of groups of sheets arranged in face-to-face relation formed of deflocculated layers of fibers having wet strength to resist penetration by the fluid and liquid being filtered, said groups of sheets having its sizes of interstices controlled by the number of layers of fibers of which the sheets are composed, those of the greater number of layers of fibers having the smaller interstices and means whereby the fluid flow is directed through the sheet in the filtering action.

7. Means for filtering fluids and liquids comprising a plurality of groups of sheets arranged in face-to-face relation formed of deflocculated layers of fibers having wet strength to resist penetration by the fluid and liquid being filtered, said groups of sheets having its sizes of interstices controlled by the number of layers of fibers, of which the sheets are composed, those of the greater number of layers of fibers having the smaller interstices, said groups being creped different amounts and arranged in the path of flow with the sheets of fewest layers of fibers having the greatest creping being first in the path of flow and those successively of more layers of fibers and less creping following in order and means whereby the fluid flow is directed through the sheet in the filtering action.

8. Means for filtering fluids and liquids comprising a plurality of groups of sheets arranged in face-to-face relation formed of deflocculated layers of fibers having wet strength to resist penetration by the fluid and liquid being filtered, said groups of sheets having the sizes of interstices controlled by the number of layers of fibers of which the sheets are composed, those of the greater number of layers of fibers having the smaller interstices, said groups being creped different amounts and arranged in the path of flow with the sheets of fewest layers having the greatest creping being first in the path of flow and those successively of more layers and less creping following in order, the creping ranging from 100% to 10%, and the layers in a ratio of 1 to 1.5 to 2 or greater and means whereby the fluid flow is directed through the sheet in the filtering action.

WILLIAM A. HERMANSON.